United States Patent [19]
Sukonnik et al.

[11] Patent Number: 5,980,658
[45] Date of Patent: Nov. 9, 1999

[54] CATALYTIC CONVERTERS-METAL FOIL MATERIAL FOR USE HEREIN, AND A METHOD OF MAKING THE MATERIAL

[75] Inventors: Israil M. Sukonnik, Plainville; Chen-Chung S. Chang, Attleboro; Bijendra Jha, North Attleboro, all of Mass.

[73] Assignee: Texas Instruments Incorporated, Dallas, Tex.

[21] Appl. No.: 08/926,526

[22] Filed: Sep. 8, 1997

[51] Int. Cl.$^6$ ..................................................... B23K 20/04
[52] U.S. Cl. ........................ 148/529; 148/530; 148/531; 148/535; 228/190; 228/235.2; 228/262.44
[58] Field of Search .................................. 148/512, 529, 148/530, 531, 534, 535; 228/190, 235.2, 262.44

[56] References Cited

U.S. PATENT DOCUMENTS

| | | | |
|---|---|---|---|
| 3,907,611 | 9/1975 | Sasame et al. | 148/523 |
| 3,912,152 | 10/1975 | Forand | 228/262.44 |
| 3,941,569 | 3/1976 | Sasame et al. | 148/531 |
| 4,079,157 | 3/1978 | Yagi et al. | 427/380 |
| 4,228,203 | 10/1980 | Yagi et al. | 427/376.8 |
| 5,366,139 | 11/1994 | Jha et al. | 148/535 |
| 5,516,383 | 5/1996 | Jha et al. | 148/535 |
| 5,553,770 | 9/1996 | Jha et al. | 228/190 |

OTHER PUBLICATIONS

*ASM Handbook,* vol. 4, Heat Treating, pp. 769–777, 1991.

*Primary Examiner*—George Wyszomierski
*Attorney, Agent, or Firm*—Russell E. Baumann; Richard L. Donaldson

[57] ABSTRACT

A metal foil substrate material with improved formability properties for catalytic converters and a method of making the material in which layers of ferritic stainless steel and aluminum are solid state metallurgically bonded together forming a composite material. Such composite material is further rolled to an intermediate foil gauge and then subjected to a thermal in situ reaction to form a resulting uniform solid solution foil material with superior high temperature corrosion resistance. This uniform solid solution material is then rolled to the final foil gauge.

16 Claims, 2 Drawing Sheets

CATALYTIC CONVERTERS-METAL FOIL MATERIAL FOR USE HEREIN, AND A METHOD OF MAKING THE MATERIAL

BACKGROUND OF THE INVENTION

This invention relates to a composite material having corrosion resistance at high temperatures and method of manufacture and, more particularly, to the material and method for producing a metal foil material for use in catalytic converters.

As well known, exhaust gases discharged from motor vehicles may contain halogen gases, halogen compounds and lead compounds, for example, $Cl_2$, $Br_2$, $PbCl_2$, $C_2H_2Cl_2$, $C_2H_2Br_2$ etc., besides unburnt noxious gases including carbon monoxide, hydrocarbon and the like, and components or parts made of ferrous base alloy material for exhaust system of the motor vehicles or the like, for example, heat exchangers, air ducts, containers, etc., tend to be subjected to corrosion by the noxious compounds as described above. Moreover, halogen compounds (e.g. salt) employed for preventing freezing during cold seasons are liable to enter these components of ferrous base alloy material, which are then corroded by the atmosphere containing halogen gas produced when the halogen compounds are decomposed at high temperatures.

It has been known to use metal foil materials as substrates with an appropriate catalyst coating in place of ceramic material substrates. Such metal foil material has been made by ingot metallurgy from steel sheets containing aluminum and also chromium in order to have the desired corrosion resistance at high temperature. These FeCrAl alloys, however, are difficult to produce by conventional rolling and annealing processes. To overcome the processing difficulties, it has been suggested, as in EP application 91115501.8, to produce the foil by a rapid solidification processing method; but such processing is expensive and requires very precise controls. It has also been suggested to dip the stainless steel in a molten bath of aluminum or aluminum alloy to apply melt-plating on the surface of the stainless steel (U.S. Pat. Nos. 3,907,611, 3,394,659 and 4,079,157). This stainless steel with the aluminum is then subjected to a heat treatment to form an alloy layer having Fe and Al as the main components. Still further, surface layers of aluminum in binder materials, as described in U.S. Pat. No. 4,228,203, have also been suggested. However, in all of these applications the control of the processing parameters is complex and expensive; and the final foil has not proven, in many cases, to have the desired corrosion/ oxidation resistance at elevated temperatures.

Still another approach is to manufacture the catalytic converter substrate material by using a metallurgically bonded composite material with layers of ferritic stainless steel and aluminum as described in U.S. Pat. No. 5,366,139 owned by the assignee of this instant application. This substrate material has proven to be very useful but in certain applications improved formability and improved dimensional stability is desired

BRIEF SUMMARY OF THE INVENTION

Accordingly, the present invention provides for a composite metal foil material and method of manufacture typically for catalytic converters having corrosion resistance at high temperatures and resistance against oxidation in an exhaust gas atmosphere and being easy to form in a corrugation or other pattern. Further, the composite material is easily and economically manufactured for high volume applications.

Briefly described, in accordance with the invention, a metal foil material is made by producing a multilayer layer material with one or more of the layers being chosen typically from the group consisting of stainless steel materials and aluminum materials; and at least another layer being made from the material not chosen for the one or more layers, as for example, a central layer of stainless steel sandwiched between two thinner outer layers of aluminum or aluminum alloys. The layer materials, having a relatively thin starting thickness, are pressure rolled together to further reduce the thickness of the layer materials, to metallurgically bond the layer materials to each other to form a composite multilayer metal material. Such composite is pressure rolled to an intermediate thickness, and then is diffusion heat treated at a temperature between about 900° C. and 1050° C. for a period of time to cause diffusion of the various constituents in the layers of the composite material throughout the material. This material is then finish rolled to a final foil thickness, thus providing for a material with the complete presence of the constituents of the aluminum layer and the stainless steel layers dispersed throughout the total foil material thereby providing for the superior corrosion/ oxidation resistance at high temperatures. Additionally, if desired, the foil at final thickness can be further annealed. This material is easily formed possessing limited anisotropy of its mechanical properties as measured from the directions along and traverse to the rolling direction and good elongation properties. Additionally, the material has good dimensional stability with smooth surface morphology.

BRIEF DESCRIPTION OF THE DRAWINGS

Other objects, advantages and details of the novel material and method of manufacture of this invention appear in the detailed description of the preferred embodiments of the inventions, the detailed description referring to the drawings in which.

DESCRIPTION OF THE PREFERRED EMBODIMENTS

Figure 1:
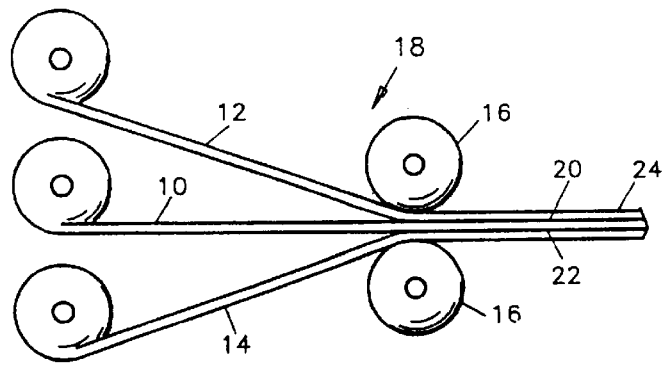
FIG. 1 shows a side elevation view diagrammatically illustrating the bonding method of this invention.
Figure 2:
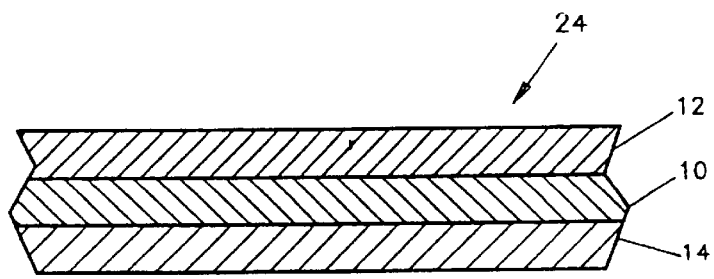
FIG. 2 shows the composite material of this invention after bonding.

In accordance with the novel and improved method and material of this invention, a first central layer 10 is sandwiched between two outer layers 12 and 14 of typically the same material. The three layers are passed between a pair of pressure rolls 16 in a conventional rolling mill 18. The layers are squeezed together with sufficient force to be reduced in thickness, and metallurgically bonded together along interfaces 20 and 22 between the metal layers to form a composite multilayer metal material 24 as shown in FIG. 2. The material is then rolled to a predetermined desired thickness and thermally reacted for sufficient time to form sheet 50 as will be explained in detail below. Lastly, the material is finished rolled to a final foil thickness which can be annealed if required.

Typically, the first layer 10 comprises a ferritic stainless steel with 16 to 24 wt. percent Cr, and the balance Fe with the S content less than 0.003 wt. percent. Examples of such ferritic stainless steels are 430, 434 and 446 stainless steels with controlled sulfur content. Preferably, top and bottom layers 12 and 14 are of the same thickness and material, and are comprised of essentially pure aluminum although aluminum alloys could also be used.

It is understood that the invention could equally well be practiced with a central relatively thinner layer of aluminum or aluminum alloys, and top and bottom layer of the ferritic stainless steel material or other layered structure. Also, other materials could be substituted for the named materials, such as nickel alloys, in place of the ferritic stainless steel materials.

Figure 3:
FIG. 3 diagrammatically shows the material of this invention after diffusion heat treatment.

In a preferred embodiment having excellent high temperature corrosion resistance, it has been found desirable to have a final chemistry in the final material 50 after thermal reaction (to be explained in detail below) of between 18 to 20 wt. percent Cr, at least 5 wt. percent Al and the balance Fe. Additionally, small amounts of rare earth metals such as Li, Ce, Y, Er, etc. can be added to either of the metals forming the composite to also increase high temperature corrosion resistance. An example of such an embodiment is where a layer of 434 stainless steel, having a thickness typically of between 0.045 and 0.075 of an inch, is bonded to essentially pure aluminum top and bottom layers having a thickness typically of between 0.004 and 0.008 of an inch thereby yielding a bonded composite of approximately 0.015 to 0.040 of an inch as shown in FIG. 3. One typical example results in a composite of about 84 percent stainless steel and a top and bottom layer of aluminum of about 8 percent each. The initial starting thicknesses of the layers have been chosen to determine the ultimate chemistry of the final composite after thermal reaction.

The composite 24 is cold rolled by convention means from the bonding gauge to a preselected intermediate thickness. At this intermediate thickness, the rolled foil is then internally reacted or diffusion heat treated at a temperature between 900° C. and 1200° C., and preferably at about 1000° C. or less for between 1 minute and 60 minutes or longer as required to provide for diffusion of the various constituents in the composite throughout the foil material. That is, after this heating operation, the microstructure of the foil will not be a three layer structure; but instead a uniform solid solution alloy. It is important that the heating be for sufficient time to dissolve any formed intermetallic compounds at preferably at a temperature to not allow for the formation of a brittle sigma phase of CrFe or other brittle compounds. The heating can be done in a vacuum, reducing atmosphere or inert atmosphere.

In accordance with this invention, the diffusion heat treatment is performed at preselected material thicknesses between the bonding thickness and finish foil thickness. This processing step allows for a finished gauge material that has good formability properties and dimensional stability. These two material properties are important in certain applications for the material such as when it is to be formed into a complex sinusoidal corrugated pattern that is brazed into a housing structure for catalytic converters. Additionally, the material has shown to have rough surface morphology without the use of such a processing step which can hinder flow of molten braze compound used in fabricating structures using the material.

The intermediate thickness at which the diffusion heat treatment is accomplished is chosen so that the percentage reduction from the intermediate thickness to final foil thickness will be about 50 percent to 75 percent. Such rolling reduction parameters allow for minimizing the need to diffusion heat treat for long periods of time and/or at high temperatures and potentially imparting undesirable ansotropic properties in the rolled material while still providing sufficient work hardening to give good grain structure to the material. The diffusion heat treatment at a preselected intermediate thickness at a desired temperature was found to impart good formability and thermally stable dimensional properties to the material at its final foil thickness while not yielding material that is brittle and difficult to roll to the final gauge. The material also had good surface morphology and grain size.

In order to give appreciation of the advantages of the invention, the following examples are given:

EXAMPLE I

A continuous strip of annealed stainless steel of the following composition: 22 wt. percent Cr, 0.6 percent Al, 0.05 wt. percent CE, 0.02 wt. percent La, 0.01 percent C, 0.02 percent N, 0.006 percent S and balance Fe with the unavoidable impurities of Mn, and Si was sandwiched between two continuous strips of Al foils in a single operation to yield a solid state metallurgically bonded three layer composite as described in U.S. Pat. No. 5,366,139 which is incorporated here for reference. This continuous strip was cold rolled on a conventional rolling mill in multiple passes until the final gauge of 0.002 inches was achieved. This foil material was then cleaned and heated to 950° C. in vacuum for 30 minutes to diffuse all the aluminum into the stainless steel base, thereby forming a completely homogeneous solid solution alloy foil material. The foil shows a nominal chemical composition of 73 wt. percent Fe, 21 wt. percent Cr and 6 wt. percent Al. The tensile elongation of this material, along traverse to the rolling direction, was tested and the results are shown below.

| Tensile Test Direction | Tensile Elongation (%) |
|---|---|
| Rolling Direction | 12 |
| Transverse Direction | 6 |

This foil material shows very significant surface roughness as compared to the pre-heat treatment condition. Surface roughness of this foil was measured by a surface roughness gauge before and after the homogenization heat treatment and the results are shown below:

| Sample Condition | Surface Roughness (micro inch) |
|---|---|
| As Cold Rolled | 3 |
| After Homogenization Annealing | 44 |

In summary, this material showed strong anisotropy and the surface roughness of this material is very high and would effect brazing of the material.

EXAMPLE II

This example was carried out identical to Example I except that the continuous heat treated homogenous alloy foil was further cold rolled to 0.0018 inches to eliminate the surface roughness. This cold rolled continuous strip was then annealed at 950° C. for 30 minutes in vacuum to completely soften the material. The tensile elongation along and transverse to the rolling direction were tested and the results are shown below:

| Tensile Test Direction | Tensile Elongation (%) |
| --- | --- |
| Rolling Direction | 10 |
| Transverse Direction | 5 |

Surface roughness of this foil was measured by a surface roughness gauge before and after the final cold rolling and the results are shown below:

| Sample Condition | Surface Roughness (micro inch) |
| --- | --- |
| As Homogenized | 40 |
| After Final Cold Rolling | 5 |

Although the surface roughness is eliminated in this example, the strong anisotropy persists and the sample does not have good forming properties.

EXAMPLE III

This example was carried out identical to Example I except that the cold rolling of composite strip was terminated at 0.004 inches. This strip was then heat treated at 950° C. for 60 minutes in a vacuum to produce the fully homogeneous solid solution strip. This homogeneous alloy strip was then cold rolled to 0.0018 inches in a conventional rolling mill. This cold rolled strip was annealed at 800° C. for 30 minutes in a vacuum to recrystallize the microstructure. The tensile elongation along and traverse to the rolling direction was tested after the final annealing and the results are shown below:

| Tensile Test Direction | Tensile Elongation (%) |
| --- | --- |
| Rolling Direction | 12 |
| Transverse Direction | 10 |

The surface roughness values were also tested before the homogenization annealing, after the homogenization annealing and after the final annealing. The results are shown below:

| Sample Condition | Surface Roughness (micro inch) |
| --- | --- |
| Before Homogenization Annealing | 5 |
| As Homogenized | 40 |
| After Final Cold Rolling | 5 |

This material shows isotropic tensile elongation and smooth surface profile which is readily suitable for forming in various shapes. Additionally, the material showed good thermal dimensional stability (minimum high temperature creep).

Figure 4:
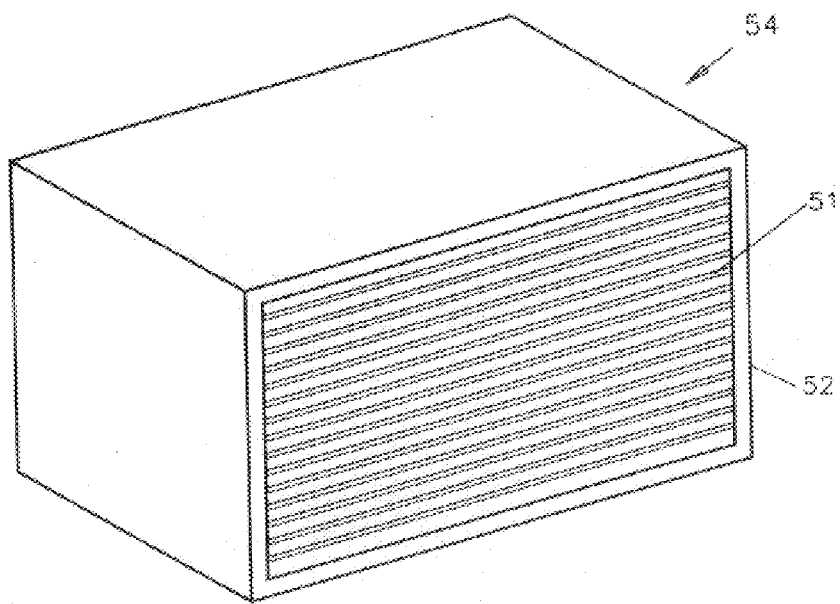
FIG. 4 diagrammatically shows the material used in a catalytic converter.
Figure 5:
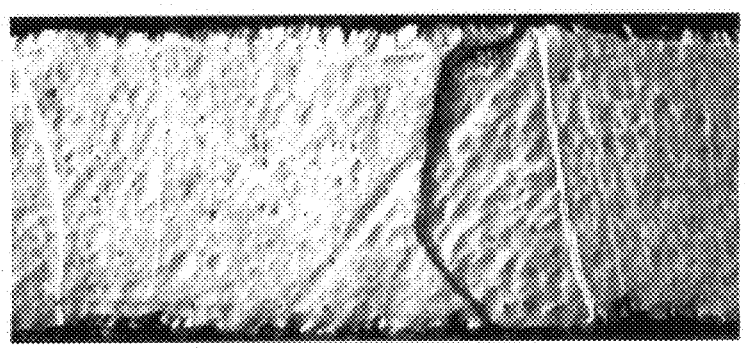
FIG. 5 shows a photomicrograph of the material of FIG. 3.

With reference to FIG. 4, the foil for use as a substrate in catalytic converters provided by the process of this invention is typically provided with an alumina whisker network on the surface of the foil. This alumina whisker network (not shown) has a ceramic, wash coat, as is known in the art, supplied on the foil substrate (not shown), and such catalytic sheet 51 (with whisker networked and wash coat) is positioned on a frame 52 to form a catalytic converter unit 54.

The novel process and article produced by method of the present invention provides for a foil material for use in catalytic converters with good corrosion resistance at elevated temperatures and excellent formability characteristics and thermal dimensional stability. It can be easily and economically used in formed sheets in a catalytic converter. The material is easily and economically manufactured having a selectively predetermined desired chemical composition. The chemical composition is uniform throughout the foil sheet. While the invention has been described in combination with the specific embodiments thereof, it is evident that many alternatives, modifications and variations will be apparent to those skilled in the art in light of a foregoing description.

We claim:

1. A method for making a foil substrate material with excellent formability having various metal constituents for catalytic converters comprising he steps of:

providing a layer of a first material chosen from the group consisting of chromium containing ferrous metals and aluminum and aluminum alloys, sandwiching said layer of first material between first and second layers of a second material chosen from the group consisting of chromium containing ferrous metals and aluminum and aluminum alloys not chosen for the first material, metallurgically bonding said layers together by reducing thickness of said layers thereby forming a multilayer composite material of said first and second materials, reducing thickness of the composite material to an intermediate thickness between a starting thickness after bonding and a finish thickness; said intermediate thickness being chosen such that said foil substrate material possesses limited anisotropy of its mechanical properties, heating said composite material in situ at a temperature between 900° C. and about 1050° C. for a sufficient period of time to cause diffusion of various metal constituents of said layers throughout the composite material thereby providing a uniform solid solution material and rolling said uniform solid solution material to said finish thickness.

2. The method according to claim 1 wherein said heating of said multilayer composite material is to a temperature of less than about 1000° C.

3. The method according to claim 1 wherein said first material is a ferritic stainless steel and said second material is aluminum.

4. The method according to claim 1 wherein said heating comprises maintaining said multilayer composite material at peak temperature for between about 1 and 60 minutes.

5. The method according to claim 1 wherein a chemical composition of the uniform solid solution material is between 18 and 22 wt. percent Cr, at least 5 wt. percent Al and the balance Fe.

6. The method according to claim 5 wherein the chemical composition further includes rare earth metals as a minor constituent.

7. The method according to claim 6 wherein said minor constituent of rare earth metals is between 0.01 and 0.10 wt. percent.

8. The method according to claim 7 wherein the chemical composition further includes a content of S of less than 0.003 wt. percent.

9. The method according to claim 1 wherein said intermediate thickness is between 0.002 of an inch and 0.008 of an inch.

10. The method according to claim 9 wherein said finish thickness is between 0.0010 of an inch and 0.0025 of an inch.

11. The method of claim 1 wherein the reduction from said intermediate thickness and said finish thickness is between about 50 percent and 75 percent.

12. The method according to claim 1 further including annealing said uniform solid solution material after rolling to finish thickness to recrystallize the microstructure.

13. A method for making a substrate material having various metal constituents for use in catalytic converters comprising the steps of:

providing a metallurgically bonded multilayer composite material with one or more of the layers chosen from the group consisting of stainless steel materials and aluminum materials and at least another layer being chosen from said groups but not the material chosen for the one or more layers, reducing the thickness of the composite material to an intermediate thickness of between about 0.002 of an inch and 0.008 of an inch, heating said composite material at a temperature and for a sufficient period of time to cause diffusion of various metal constituents of said layers throughout the composite material thereby providing a uniform solid solution material, and rolling said uniform solid solution material to a finish thickness of between about 0.0010 of an inch and 0.0025 of an inch wherein said intermediate thickness is chosen such that said substrate material possesses at least one of the properties chosen from the group consisting of limited anisotropy in its mechanical properties and a surface roughness of not greater than about 5 micro inches.

14. A method for making a foil substrate material having various metal constituents for catalytic converters comprising the steps of:

providing a layer of a first material chosen from the group consisting of chromium containing ferrous metals and aluminum and aluminum alloys, sandwiching said layer of first material between first and second layers of a second material chosen from the group consisting of chromium containing ferrous metals and aluminum and aluminum alloys not chosen for the first material, metallurgically bonding said layers together by reducing thickness of said layers thereby forming a multilayer composite material of said first and second materials, reducing thickness of the composite material to an intermediate thickness between a starting thickness after bonding and a finish thickness; said intermediate thickness being chosen such that said foil substrate material possesses a surface roughness of not greater than about 5 micro inches, heating said composite material in situ at a temperature between 900° C. and about 1050° C. for a sufficient period of time to cause diffusion of various metal constituents of said layers throughout the composite material thereby providing a uniform solid solution material and rolling said uniform solid solution material to said finish thickness.

15. The method of claim 14 wherein the reduction from said intermediate thickness and said finish thickness is between about 50 percent and 75 percent.

16. The method according to claim 14 further including annealing said uniform solid solution material after rolling to finish thickness to recrystallize the microstructure.

\* \* \* \* \*

UNITED STATES PATENT AND TRADEMARK OFFICE
CERTIFICATE OF CORRECTION

PATENT NO. : 5,980,658
DATED : November 9, 1999
INVENTOR(S) : Israil M. Sukonnik, Chen-Chung S. Chang, Bijendra Jha It is certified that error appears in the above-identified patent and that said Letters Patent is hereby corrected as shown below:

On the title page, Item [54] & col. 1, line 2, the word --HEREIN" should be --THEREIN--.

On the title page, insert the following item:

--[60] Provisional application No. 60/032,154, December 6, 1996--.

Column 1, line 4, insert the following:

--CROSS REFERENCE TO RELATED APPLICATION
Reference is made to and priority claimed from U.S. provisional Ser. No. 60/032,154, filed Dec. 6, 1996, entitled Catalytic Converters – Metal Foil Material For Use Therein, and A Method of Making the Material --.

Signed and Sealed this

Ninth Day of January, 2001

*Attest:*

Q. TODD DICKINSON

*Attesting Officer*  *Commissioner of Patents and Trademarks*